(12) United States Patent
Goth et al.

(10) Patent No.: US 7,252,464 B2
(45) Date of Patent: Aug. 7, 2007

(54) HYDRAULIC STOP

(75) Inventors: Robert James Goth, Balderstone (GB); Stephen Graham Penny, Balderstone (GB); Barry James Ditchfield, Balderstone (GB); Robert Lawrence Mullins, Wooton-Under-Edge (GB)

(73) Assignee: BAE Systems plc, London (GB)

( * ) Notice: Subject to any disclaimer, the term of this patent is extended or adjusted under 35 U.S.C. 154(b) by 175 days.

(21) Appl. No.: 10/516,254

(22) PCT Filed: Oct. 15, 2004

(86) PCT No.: PCT/GB2004/004354

§ 371 (c)(1), (2), (4) Date: Nov. 30, 2004

(87) PCT Pub. No.: WO2005/039809

PCT Pub. Date: May 6, 2005

(65) Prior Publication Data

US 2006/0159528 A1    Jul. 20, 2006

(30) Foreign Application Priority Data

Oct. 17, 2003  (EP)  .................. 03256576
Oct. 17, 2003  (GB)  .................. 0324383.9

(51) Int. Cl.
*B23B 47/00* (2006.01)
(52) U.S. Cl. .................. 408/130; 408/15; 408/110
(58) Field of Classification Search .................. 408/5, 408/7, 10, 12, 14, 15, 56, 110, 13, 17, 113, 408/130; B23B 47/00
See application file for complete search history.

(56) References Cited

U.S. PATENT DOCUMENTS 2,796,161 A * 6/1957 Graybill .................. 192/138

(Continued)

FOREIGN PATENT DOCUMENTS

EP    0 584 412 A1    8/1992

(Continued)

OTHER PUBLICATIONS

International Preliminary Report (Form PCT/IB/373) dated Apr. 18, 2006; including Written Opinion of the International Searching Authority (Form PCT/ISA/237) (Six (6) pages).

*Primary Examiner*—Monica Carter
*Assistant Examiner*—Eric A. Gates
(74) *Attorney, Agent, or Firm*—Crowell & Moring LLP

(57) ABSTRACT

A hydraulic stop for use in drilling or countersinking operations comprises a rotatable body for rotating a tool about its axis. A cage adapted to contact the surface of a workpiece when the tool has penetrated into the workpiece by a predetermined distance actuates a trip mechanism comprising a plunger-operated hydraulic valve as the tool penetrates the workpiece more than the predetermined distance. The plunger is of adjustable length. When actuated the trip mechanism allows the body to shrink in length suddenly. The cage is axially adjustable in relation to the body to set the predetermined depth at which the trip mechanism actuates. A plurality of holes spaced around the circumference of the body to which the cage is mounted allow drainage of coolant whatever the axial position of the cage.

8 Claims, 1 Drawing Sheet

U.S. PATENT DOCUMENTS

| | | | |
|---|---|---|---|
| 2,967,441 A * | 1/1961 | Miles | 408/73 |
| 4,273,481 A * | 6/1981 | Corley et al. | 408/14 |
| 4,329,092 A * | 5/1982 | Ponitzsch et al. | 408/11 |
| 4,446,886 A | 5/1984 | Taylor et al. | |
| 4,530,625 A * | 7/1985 | Corley et al. | 408/14 |
| 5,161,921 A * | 11/1992 | Corsi | 408/1 R |
| 5,277,523 A * | 1/1994 | Jones | 408/14 |
| 5,927,910 A * | 7/1999 | Fix, Jr. | 408/17 |
| 6,368,031 B1 | 4/2002 | Martinek et al. | |

FOREIGN PATENT DOCUMENTS

| | | |
|---|---|---|
| GB | 599569 | 9/1945 |
| GB | 2 043 500 A | 2/1980 |
| GB | 2 247 634 A | 3/1992 |

\* cited by examiner

HYDRAULIC STOP

This invention relates to the field of cutting tools, particularly to a hydraulic stop for use in drilling or countersinking operations.

The variability between products on a production line is often greater than the tolerance of the machine tool, i.e. the operator cannot be certain of the exact position of the surface of the product relative to the tool. The use of a hydraulic stop that senses the location of the workpiece surface and limits the penetration of the cutting tool into the workpiece without the need for operator intervention, improves the accuracy of the machining operation, enables the operation to be repeated with that level of accuracy and greatly reduces the time taken.

A conventional hydraulic stop, as described in U.S. Pat. No. 4,530,625, is attached at one end to the spindle of a numerical control machine and at the other holds a cutting tool, which engages a workpiece. In use, the hydraulic stop approaches the workpiece and begins the cutting operation. A locking plate within the hydraulic stop keeps two parts of the body engaged so they are not capable of relative rotation. As the cage contacts the workpiece, a plunger unseats a ball bearing from its housing which hydraulically reduces the spring force significantly, which normally urges the two parts of the body together, and the two parts of the body disengage so that the length of the body can reduce by a significant amount. This is usually described as the "collapsing" of the hydraulic stop. This prevents the tool penetrating the workpiece further than the predetermined position. On reversal of the numerical control machine spindle, the hydraulic fluid is recycled within the stop, the two parts re-engage and the process can be repeated. The position of the head of the unit is adjusted with respect to the cutting tool to control the depth to which the cutting tool penetrates.

The functioning of the unit is highly dependent on the length of the plunger. Due to engineering tolerances, every plunger and hydraulic stop body is likely to be slightly different in length and therefore it is not possible to interchange plungers. The hydraulic stop has to be set up very accurately so that it actuates at exactly the right time, simultaneously with the disengaging of the two body parts. If the plunger is too long, the unit collapses too early in the cutting cycle; if the plunger is too short, the unit does not collapse at all. The plunger length has to be determined through a process of trial and improvement, disassembling the unit to remove the plunger to shorten it on a different machine by cutting or shaving a length off and then reassembling the unit for testing. The process has to be repeated if the plunger length is still incorrect. The act of disassembling the unit and removing the plunger to shorten its length is a highly time consuming process and leads to inaccuracies. If the plunger is shortened too much it becomes scrap and the process begun again with a new plunger.

In addition, the length of the plunger is heat dependent and as such varies during use when heat is transmitted from the cutting area through the mechanism to the plunger. This leads to inaccuracy of the operation of the hydraulic stop which is highly undesirable, particularly where the depth of the cutting operation is critical. While the length of the plunger may be adjusted while it is cold such that it operates within the tolerances for correct usage, it is possible that when the plunger heats up it expands to a length outside the tolerances, and therefore does not operate correctly during use.

Accordingly, the present invention provides a hydraulic stop of improved accuracy for use in drilling or countersinking operations comprising:

a rotatable body for rotating a tool about its axis a cage adapted to contact the surface of a workpiece when the tool has penetrated into the workpiece by a predetermined distance and to actuate a trip mechanism comprising a plunger operated hydraulic valve as the tool penetrates the workpiece more than the predetermined distance, the trip mechanism being effective when actuated to allow the rotatable body to reduce in length parallel to the axis of the tool, wherein the plunger is of adjustable length, and wherein the cage is axially adjustable in relation to the body to set the predetermined depth at which the trip mechanism actuates, and wherein drainage means is provided, comprising a plurality of circumferentially-spaced holes adapted to allow drainage of coolant from the cage whatever its axial position.

The adjustability of the plunger length enables the unit to be set up quickly and with ease and the plunger to be used with accuracy in any hydraulic stop. With a mechanism for adjusting the length of the plunger, any over-correction of the length may be reversed unlike in conventional hydraulic stops. The adjustability allows the plunger to be adjusted so it is of just the right length to accommodate variations in the length that occur on heating.

The plurality of drain holes allows coolant to drain more easily from the cage area of the unit, particularly when the unit head is in close proximity to the component surface, avoiding the build up of coolant. A build up and stagnation of coolant is detrimental to the unit, causing corrosion of internal components and removing grease from bearings. The improved flow of coolant ensures that the heat generated by the cutting tool and any bearings within the front end of the unit is removed from the area, resulting in a stable operating temperature during the period of use, leading to improved accuracy and repeatability of depth control.

Preferably, at least part of the plunger is accessible from outside the body in order to adjust the length of the plunger without removing it from the body. This significantly reduces the time taken to set up the unit before use because the unit does not have to be disassembled and the plunger taken back and forth to another machine for adjustment until the correct length is found.

Advantageously, the drain holes are equally spaced around the circumference of the body. This improves the flow of coolant from around the head of the hydraulic stop unit, avoiding a build up of coolant in a local area.

Optionally, the drain holes are located in slots parallel to the axis of the body. This improves the flow of coolant away from the head of the unit.

Preferably, the cage comprises a small flat annulus adapted to contact the surface of the workpiece and supported by walls by which the cage is mounted to the body. A flat annulus can be configured and accurately machined to provide the desired contact with the workpiece.

Advantageously, the angle between the annulus and the cage walls is greater than 90 degrees and is preferably 135 degrees. Such cages are more resilient than those with walls perpendicular to the annulus and do not deflect on contact with the workpiece surface, thereby improving accuracy of the hydraulic stop. The cage walls preferably would have holes or slits to allow a through flow of coolant.

The invention will now be described by way of example and with reference to the accompanying drawings, in which.

Figure 1:
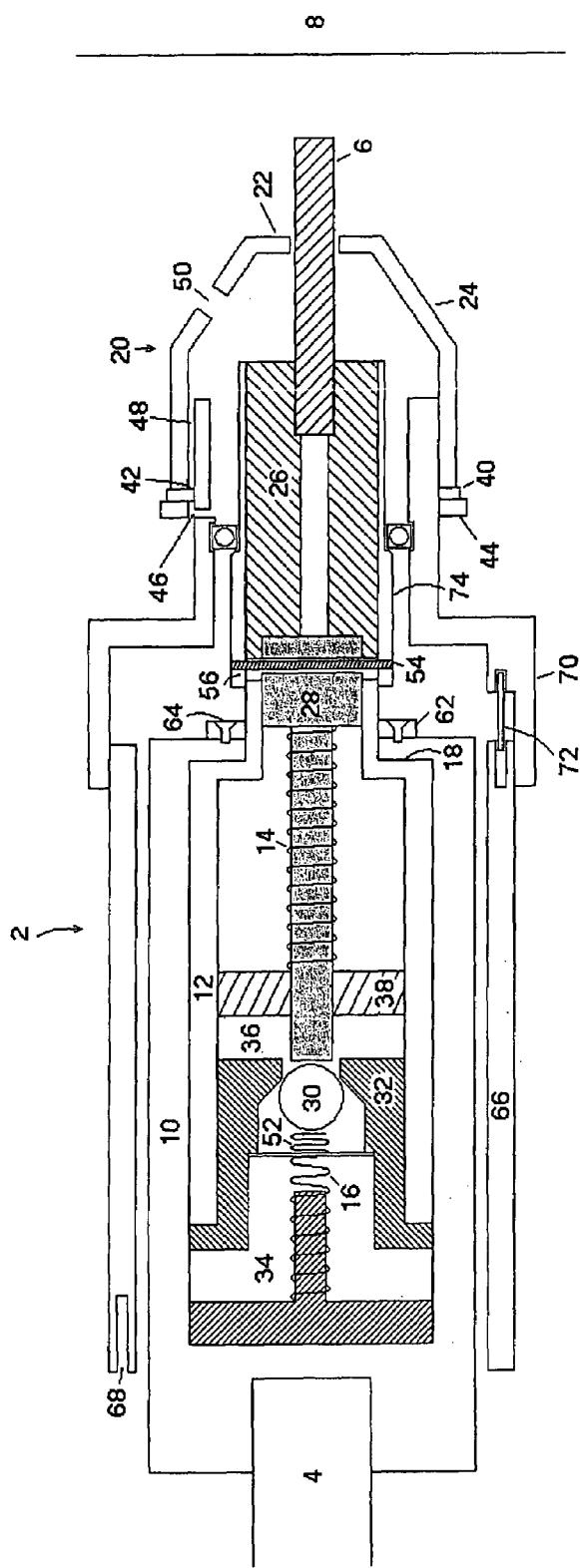
FIG. 1 is a schematic cross-section view of an embodiment of a hydraulic stop in accordance with the invention.
Figure 2:
FIG. 2 shows the locking plate shown in FIG. 1 in greater detail.

In FIG. 1, a hydraulic stop 2 is attached to the spindle 4 of a numerical control machine (not shown) and holds a cutting tool 6, which engages a workpiece 8. The body of the hydraulic stop comprises two parts 10, 12 which are held in engagement with one another by a locking plate 62, so that they are not capable of relative rotation. The locking plate 62 is attached to body part 10 by screws 64; the flat sides of locking plate 62 engaging with flat surfaces of body part 12 (see FIG. 2) to ensure the two parts 10, 12 do not rotate relative to one another. Returning to FIG. 1, a cage 20, comprising an annulus 22 and supporting walls 24, surrounds the front end of the unit and part of the tool 6. The cage 20 is connected to a collar 70, which is held by pin 72 to body cover 66, the pin 72 allowing the cage and collar to move towards and away from the numerical control machine (to the left and right of the drawing) yet locking the cage 20 and collar 70 in rotational engagement with the body cover 66. The body cover 66 is held stationary by an attachment 68 to the numerical control machine and therefore both the body cover 66, collar 70 and cage 20 do not rotate with the parts 10, 12 and the tool 6. In use, the tool 6 engages the workpiece 8 and begins the cutting operation. As the head of the unit (i.e. annulus 22 of the cage) comes into contact with the workpiece 8, a load is applied, causing the collar 70 and sleeve 74 to move towards the numerical control machine (to the left as shown in the drawing). This causes a pin 54 located behind the tool holding member 26 to move towards the numerical control machine within hole 56, causing a plunger 28 to also move in the same direction. This movement of the plunger 28 unseats a ball bearing 30 from its housing 32. Hydraulic fluid flows from chamber 34, past the ball bearing 30 through the valve into chamber 36. The fluid entering chamber 36 moves piston 38, against the spring force exerted by spring 14, towards the workpiece (to the right as shown in the drawing). The effective pressure of the hydraulic fluid behind the valve is reduced, so that if more force is applied to the cage 20, the housing 32 is free to move back, towards the numerical control machine against the relatively weak force exerted by spring 16. The tool therefore does not penetrate the workpiece further than the predetermined distance due to the axial disengagement of body parts 10, 12 and the ability of the housing 32 to move, with the body part 12 and the front of the unit, back towards the numerical control machine, body part 12 sliding axially inside body part 10.

As the numerical control machine reverses its direction, its spindle 4 moves away from the workpiece 8. The cage 20 leaves the surface of the workpiece and plunger 28 is forced away from the spindle 4 by a spring 14 which also causes chamber 36 to decrease in size, so forcing the hydraulic fluid through the ball valve into chamber 34, which is caused to expand. When the hydraulic fluid pressure in chambers 34 and 36 is equalised, the ball bearing 30 reseats in its housing 32 due to spring 52. The hydraulic stop is then ready for the next machining operation. Thus the collapsing process described above has been reversed.

The hydraulic stop is arranged to give the required depth control by adjusting the axial position of the cage 20 in relation to the tool holding member 26. The cage is mounted to the collar 70 by means of a screwthread (not shown). The screwthread provides means for adjustment of the axial position of the cage and the annulus 22 in relation to the tool holding member 26. Ring 40 is placed against the cage, a lug 42 on the ring engaging a slot in the collar 70, that runs parallel to the axis of the tool holding member 26. Ring 40 is thereby prevented from rotating with respect to the body. Ring 44 is tightened against ring 40 via the screwthread, locking the cage in position with respect to the body.

In most drilling and cutting operations coolant is sprayed onto the point where the tool pierces the workpiece to remove swarf and keep the tool cool to prevent overheating. To avoid coolant entering and building up around the head of the unit, drain holes 46 (for clarity, only one is illustrated) are provided around the circumference of the body. These holes, which may be of any shape, prevent coolant and entrained swarf collecting inside the unit and thereby causing cumulative damage (e.g. removal of grease from bearings, corrosion of internal components, deposit build-up). An improved coolant flow also improves the removal of heat from the area, avoiding expansion of the plunger and leading to improved accuracy and repeatability of depth control. A plurality of drainage holes (for example, six) ensures that the drainage of coolant is not substantially affected if one drainage pathway is blocked, for example by the lug 42 on ring 40. For maximum benefit, the drain holes are equally spaced around the circumference of the body. This avoids build-up of coolant in local areas. The drain holes 46 are located in slots 48 running parallel to the axis of the body, such as that engaged by the lug 42 on ring 40. The provision of slots 48 in the head of the unit facilitates the flow of coolant away from the head of the unit. Holes 50 are also provided in the cage walls 24 to improve the flow of coolant.

Figure 3:
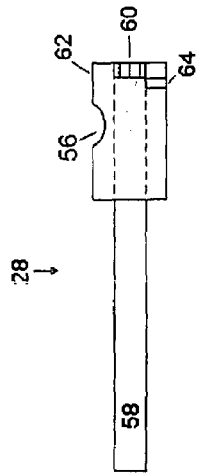
FIG. 3 shows the plunger shown in FIG. 1 in greater detail.

Before use, the length of the plunger is adjusted as necessary to ensure the hydraulic stop functions correctly. The plunger 28, shown in greater detail in FIG. 3, comprises a shaft 58 which engages a head 62 via a screwthread (not shown). The length of the plunger is adjusted by the following steps. A pin 54 is retracted from an off-centre hole 56 in body part 12 and the plunger rotated until grub screw 64, which normally prevents the shaft 58 from moving with respect to the head 62, is accessible. The grub screw 64 is partially unscrewed to allow movement between the shaft 58 and head 62, and the pin 54 is returned to hole 56 to hold the head 62 still while the shaft 58 is turned with a hex key in a matching recess 60. Once the length has been adjusted by the required amount, the pin 54 is then removed and the plunger rotated until the grub screw 64 is accessible. The grub screw 64 is tightened and the pin 54 replaced. If the plunger length is shortened too much in error, the mistake is easily rectified by reversing the adjustment.

The accuracy of the hydraulic stop can be improved by fitting stronger internal springs 14, 16. This reduces the relative movement between the cage and the tool but the stronger spring force transmits more force onto the workpiece, increasing the risk of deflection of the cage. However, the present invention has a cage specifically designed to be short and stiff to reduce cage deflection so avoiding inaccuracy in the depth control. While the cage 20 may have walls 24 substantially perpendicular to the annulus 22, it is preferable for the walls to be at an angle other than perpendicular to the annulus (as can be seen the angle between the annulus 22 and cage walls 24 is approximately 135 degrees in FIG. 1), as this provides the cage with greater stiffness.

The invention claimed is:

1. A hydraulic stop for use in drilling or countersinking operations comprising
   - a rotatable body for rotating a tool about its axis; and
   - a cage adapted to contact the surface of a workpiece when the tool has penetrated into the workpiece by a predetermined distance, and to actuate a trip mechanism comprising a plunger operated hydraulic valve as the tool penetrates the workpiece by more than the predetermined distance; wherein
   - the trip mechanism is effective, when actuated, to allow the rotatable body to reduce in length parallel to the rotating axis of the tool;
   - the plunger has an adjustable length;
   - the cage is axially adjustable in relation to the body to set the predetermined distance at which the trip mechanism actuates; and
   - a plurality of holes which are spaced around the circumference of the body allow drainage of coolant from the cage whatever its axial position.

2. A hydraulic stop as in claim 1 wherein at least part of the plunger is accessible from outside the body in order to adjust the length of the plunger.

3. A hydraulic stop as in claim 1 wherein the plurality of drain holes are equally spaced around the circumference of the body.

4. A hydraulic stop as in claim 1 wherein the body has six drain holes spaced around its circumference.

5. A hydraulic stop as in claim 1 wherein the drain holes are located in slots parallel to the axis of the body.

6. A hydraulic stop as in claim 1 wherein the cage comprises a small flat annulus adapted to contact the surface of the workpiece and supported by walls by which the cage is mounted to the body.

7. A hydraulic stop as in claim 6 wherein the angle between the annulus and the cage walls is greater than 90 degrees.

8. A hydraulic stop as in claim 6 wherein the angle between the annulus and the cage walls is 135 degrees.

* * * * *